United States Patent
Shimogawa et al.

(10) Patent No.: US 9,384,031 B2
(45) Date of Patent: Jul. 5, 2016

(54) INFORMATION PROCESSOR APPARATUS, VIRTUAL MACHINE MANAGEMENT METHOD AND VIRTUAL MACHINE MANAGEMENT PROGRAM

(75) Inventors: Kenichirou Shimogawa, Kawasaki (JP); Akio Takebe, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 767 days.

(21) Appl. No.: 13/414,146

(22) Filed: Mar. 7, 2012

(65) Prior Publication Data

US 2012/0233613 A1    Sep. 13, 2012

(30) Foreign Application Priority Data

Mar. 9, 2011    (JP) .................... 2011-051246

(51) Int. Cl.
G06F 9/455    (2006.01)
G06F 9/46    (2006.01)

(52) U.S. Cl.
CPC .. G06F 9/45558 (2013.01); *G06F 2009/45583* (2013.01)

(58) Field of Classification Search
None
See application file for complete search history.

(56) References Cited

U.S. PATENT DOCUMENTS

| | | | |
|---|---|---|---|
| 7,716,275 B1 * | 5/2010 | Nagaralu et al. | 709/203 |
| 8,296,419 B1 * | 10/2012 | Khanna | G06F 9/5072 709/201 |
| 8,380,853 B2 * | 2/2013 | Kudo | 709/226 |
| 8,429,276 B1 * | 4/2013 | Kumar et al. | 709/226 |
| 8,762,367 B2 * | 6/2014 | Burger et al. | 707/718 |
| 8,776,049 B2 * | 7/2014 | Walker | 718/1 |
| 2002/0059427 A1 | 5/2002 | Tamaki et al. | |
| 2002/0087611 A1 | 7/2002 | Tanaka et al. | |
| 2006/0136695 A1 * | 6/2006 | Vaupel | 711/173 |
| 2008/0076440 A1 * | 3/2008 | Guo et al. | 455/452.2 |
| 2009/0119673 A1 | 5/2009 | Bubba | |
| 2009/0172168 A1 * | 7/2009 | Sonoda et al. | 709/226 |
| 2009/0326869 A1 * | 12/2009 | Baba | 702/186 |
| 2011/0029969 A1 * | 2/2011 | Venkataraja et al. | 718/1 |
| 2011/0055712 A1 * | 3/2011 | Tung et al. | 715/738 |
| 2012/0131161 A1 * | 5/2012 | Ferris et al. | 709/223 |
| 2012/0131591 A1 * | 5/2012 | Moorthi et al. | 718/104 |
| 2012/0233315 A1 * | 9/2012 | Hoffman et al. | 709/224 |
| 2013/0212086 A1 * | 8/2013 | Burger et al. | 707/718 |

FOREIGN PATENT DOCUMENTS

| | | |
|---|---|---|
| JP | 2002-24192 | 1/2002 |
| JP | 2002-202959 | 7/2002 |
| JP | 2011-503713 | 1/2011 |

* cited by examiner

*Primary Examiner* — Lewis A Bullock, Jr.
*Assistant Examiner* — Kevin X Lu
(74) *Attorney, Agent, or Firm* — Staas & Halsey LLP

(57) ABSTRACT

An information processing apparatus that controls a resource allocation amount for one or a plurality of virtual machines run by a computer, the information processing apparatus includes a memory that stores an allowable index upper limit and index information indicating an association between the resource allocation amount and an index and a processor that, when a virtual machine lacking resources is detected from a resource usage status, increases the resource allocation amount allocated to the virtual machine lacking resources such that an index value calculated according to the index information and the resource allocation amount for the one or a plurality of virtual machines does not exceed the upper limit.

7 Claims, 13 Drawing Sheets

FIG. 6

| | | 111 | | |
|---|---|---|---|---|
| FEE REFERENCE TABLE | | | | |
| CAPACITY RANK | CPU CAPACITY VALUE | MEMORY SIZE | MONTHLY FEE | HOURLY FEE |
| MINI | 1GHz | 512MB | 7200 | 10 |
| SMALL | 3GHz | 1GB | 14400 | 20 |
| MEDIUM | 4GHz | 2GB | 28800 | 40 |
| LARGE | 6GHz | 4GB | 57600 | 80 |

FIG. 8

FEE SUMMARY TABLE 113

| USER | VM NAME | CURRENT RANK | MINI TIME | SMALL TIME | MEDIUM TIME | LARGE TIME | TOTAL FEE |
|---|---|---|---|---|---|---|---|
| U001 | VM1 | MINI | 10 | 20 | 120 | 18 | 6740 |
| | VM2 | SMALL | 50 | 60 | 58 | 0 | 4020 |
| | VM3 | MEDIUM | 100 | 50 | 18 | 0 | 2720 |
| | VM4 | LARGE | 0 | 0 | 104 | 64 | 9280 |
| | ALL VMS | — | 160 | 130 | 300 | 82 | 22760 |

FIG. 9

RESOURCE MANAGEMENT TABLE 114

| USER | VM NAME | CPU ALLOTMENT | CPU UTILIZATION RATE | MEMORY ALLOTMENT | MEMORY UTILIZATION RATE |
|---|---|---|---|---|---|
| U001 | VM1 | 1GHz | 50% | 512MB | 60% |
| | VM2 | 3GHz | 100% | 1GB | 80% |
| | VM3 | 4GHz | 60% | 2GB | 40% |
| | VM4 | 6GHz | 70% | 4GB | 70% |

INFORMATION PROCESSOR APPARATUS, VIRTUAL MACHINE MANAGEMENT METHOD AND VIRTUAL MACHINE MANAGEMENT PROGRAM

CROSS-REFERENCE TO RELATED APPLICATION

This application is based upon and claims the benefit of priority of the prior Japanese Patent Application No. 2011-051246, filed on Mar. 9, 2011, the entire contents of which are incorporated herein by reference.

FIELD

The present embodiment discussed herein is related to an information processing apparatus, a virtual machine management method, and a virtual machine management program.

BACKGROUND

Virtualization technology that allows one or more virtual computers (also called virtual machines) to be run on a physical computer is presently being used in the field of information processing. Each virtual machine is run by an operating system (OS). For example, software (also called a hypervisor) that allocates computer resources such as a central processing unit (CPU) and a random access memory (RAM) to the virtual machines is executed on a computer that runs one or more virtual machines. The operating system of each virtual machine control application program scheduling and the like within the scope of the allocated resources.

Recently, services are being used that rent out rights to use computer resources to users and bill the users according to usage conditions such as the amount and time of resource usage. The format for using such services is called "infrastructure as a service" (IaaS). Virtualization technology may be used on a computer to run one or more virtual machines per user to simplify billing management and separation of processing between users.

A method has been proposed to increase computing devices allocated to users and to update billing information when comparing a user service level contract and computer CPU utilization rate in a data center when the service level is not reached. There has also been proposed a method of presetting an upper threshold and a lower threshold for loads in a system that divides physical resources into logical partitions (LPAR) and allocates the LPARs to users. There has further been proposed a method of increasing resource allocations when the load exceeds the upper threshold and returning the amount of the increased resources to an initial value when the load falls below the lower threshold.

(See Japanese Laid-Open Patent Publication No. 2002-24192, and Japanese Laid-Open Patent Publication No. 2002-202959 (paragraph 0075).)

However, one problem is how to find the best way to control the amount of resources allocated when loads on virtual machines increase. For example, a user may desire the resources to be appropriately allocated in conjunction with the increase in load. On the other hand, another user may desire that fees do not become too high in a service usage format in which billing is conducted according to the amount of resources allocated.

SUMMARY

According to an aspect of the invention, an information processing apparatus that controls a resource allocation amount for one or a plurality of virtual machines run by a computer, the information processing apparatus includes a memory that stores an allowable index upper limit and index information indicating an association between the resource allocation amount and an index and a processor that, when a virtual machine lacking resources is detected from a resource usage status, increases the resource allocation amount allocated to the virtual machine lacking resources such that an index value calculated according to the index information and the resource allocation amount for the one or a plurality of virtual machines does not exceed the upper limit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 illustrates an example of a data structure of a fee reference table.

FIG. 8 illustrates an example of a data structure of a fee summary table.

FIG. 9 illustrates an example of a data structure of a resource management table.

DESCRIPTION OF EMBODIMENTS

The following embodiments will be explained with reference to the drawings.

First Embodiment

Figure 1:
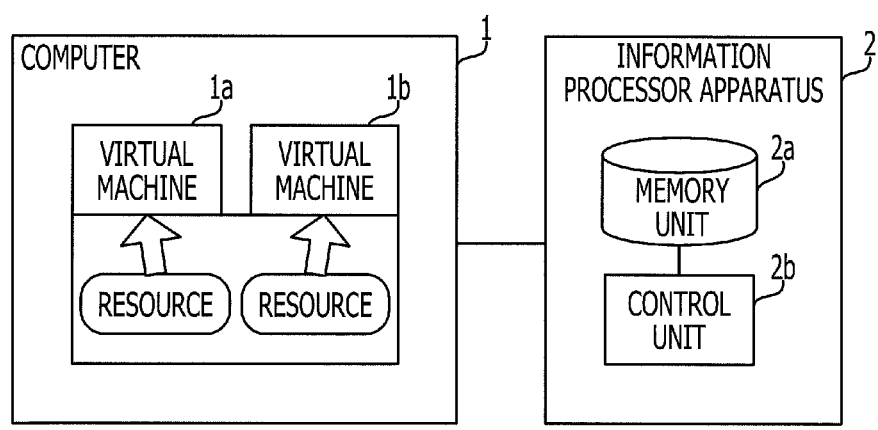
FIG. 1 illustrates a configuration of an information processing system according to a first embodiment.

FIG. 1 illustrates a configuration of an information processing system according to a first embodiment. The configuration of an information processing system according to the first embodiment includes a computer 1 and an information processor apparatus 2. The information processor apparatus 2 may communicate with the computer 1. The configuration of the information processing system according to the first embodiment may also include one or more computers in addition to the computer 1.

The computer 1 (or multiple computers or processors including the computer 1) runs one or more virtual machines. The following explanation of the first embodiment considers a case where the computer 1 runs virtual machines 1a and 1b.

The computer 1 also has a management unit such as a hypervisor and the like. The management unit allocates resources such as CPU and RAM of the computer 1 to the virtual machines 1a and 1b under the control of the information processor apparatus 2. The virtual machines 1a and 1b are each operated, for example, by an operating system.

The information processor apparatus 2 controls the amount of resources allocated to the virtual machines. The information processor apparatus 2 includes a memory unit 2a and a control unit 2b. The information processor apparatus 2 is made up of, for example, a computer or a processor or the like.

The memory unit 2a stores index information indicating an allowable index upper limit and an association between the amount of resources allocated and an index. The value of the index changes according to the amount of resources allocated, and may be, for example, a virtual machine usage fee. The association indicated in the index information has a positive correlation whereby an increase in the index value corresponds to an increase in the amount of resources allocated. The upper limit is, for example, a permissible value of a fee generated due to a user using one or more virtual machines. The upper limit may, for example, be set by the user using the one or more virtual machines. The memory unit 2a is made up of a memory or the like.

The control unit 2b attempts to increase the amount of resources allocated to the virtual machine 1a when a virtual machine lacking resources (for example, when the virtual machine 1a suffers from a lack of resources) is detected from the usage conditions of the computer 1 resources. The virtual machine 1a's lack of resources may be detected by, for example, collecting information indicating load such as the CPU or memory utilization rates for each virtual machine, and then determining whether or not there is a virtual machine with a load that exceeds a threshold. The control unit 2b calculates index values (for example, the fee generated from all of the virtual machines 1a and 1b) based on the index information and the amount of resources allocated for the virtual machines 1a and 1b, and then increases the amount of resources allocated to the virtual machine 1a to the extent that each index does not surpass the index's respective upper limit.

The control unit 2b may decrease the amount of resources allocated to another virtual machine (e.g., the virtual machine 1b) if the index value would exceed the upper limit if the amount of resources allocated to the virtual machine 1a is increased. Additionally, the control unit 2b may calculate an allowable time period for increasing resources allocated based on a difference between the upper limit and the index value before increasing the amount of resources allocated, and then increase the amount of resources allocated for the calculated time period. In that case, when the calculated time period has expired, the amount of resources allocated to the virtual machine 1a may be returned to an initial amount, or the amount of resources allocated to another virtual machine (e.g., the virtual machine 1b) may be reduced.

For example, if it is determined that the CPU utilization rate of the virtual machine 1a is high and the virtual machine 1a lacks resources, the control unit 2b calculates the index value when the amount of resources allocated to the virtual machine is increased and compares the calculated index value with the upper limit. If the index value is less than or equal to the upper limit, the control unit 2b increases the amount of resources allocated to the virtual machine 1a. On the other hand, if the index value exceeds the upper limit, the control unit 2b determines whether or not, for example, the index value becomes less than or equal to the upper limit if the amount of resources allocated to the virtual machine 1b is reduced. If the index is less than or equal to the upper limit, the control unit 2b conducts controls so as to increase the amount of resources allocated to the virtual machine 1a and decrease the amount of resources allocated to the virtual machine 1b.

The information processor apparatus 2 detects a lack of resources in the virtual machine 1a from the usage conditions of the computer 1's resources. The information processor apparatus 2 calculates the index value based on the amount of resources allocated to the virtual machines 1a and 1b and based on the index information recorded in the memory unit 2a. The information processor apparatus 2 increases the amount of resources allocated to the virtual machine 1a lacking resources such that the index value does not exceed the upper limit stored in the memory unit 2a.

As a result, the amount of resources allocated to one or more virtual machines may be controlled to fluctuate between a suitable range. For example, a total of fees for the use of one or more virtual machines by a user may be controlled to not exceed an upper limit set by the user. Additionally, the amount of resources allocated to a virtual machine lacking resources may be automatically controlled to be increased within a range that does not exceed an upper limit.

The following explanation of a second embodiment describes an example of an information processing system using multiple server computers to run a virtual machine having performance as desired by a user.

Second Embodiment

Figure 2:
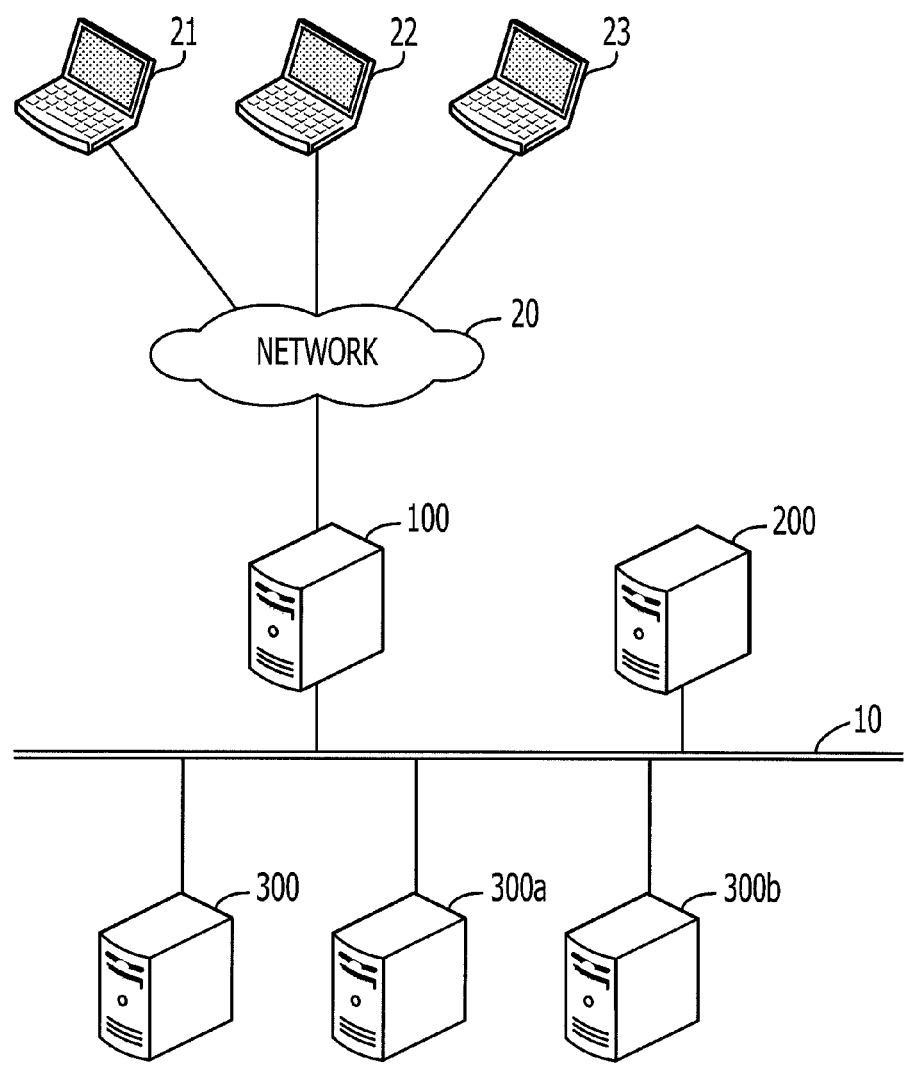
FIG. 2 illustrates a configuration of an information processing system according to a second embodiment.

FIG. 2 illustrates a configuration of an information processing system according to the second embodiment. The information processing system according to the second embodiment accepts requests from clients with multiple server computers (hereinbelow, may be referred to simply as "server") to run virtual machines according to the requests. A user operates a virtual machine through a client and uses a virtual machine as a personal information processing system platform.

The information processing system includes a portal server 100, a management server 200, and execution servers 300, 300a, and 300b. The portal server 100, the management server 200, and the execution servers 300, 300a, and 300b are connected to a network 10. The portal server 100 is also connected to a network 20. Clients 21, 22, and 23 are also connected to the network 20.

The clients 21, 22, and 23 are information processor apparatuses operated by users. The clients 21, 22, and 23, via the portal server 100, request virtual machines being run in the execution servers 300, 300a, and 300b to conduct processing. The clients 21, 22, and 23 receive from the execution servers 300, 300a, and 300b processing results concerning the requests.

The portal server 100 is a server computer that manages an amount of resources allocated to the virtual machines run by the execution servers 300, 300a, and 300b. The portal server 100 also manages billing conditions for each user according to the amount of resources allocated to each of the virtual machines.

The management server 200 is a server computer that controls the activation and termination of the virtual machines in the execution servers 300, 300a, and 300b. The management server 200 changes the amount of resources allocated to the virtual machines according to instructions from the portal server 100.

The execution servers 300, 300a, and 300b are server computers that run virtual machines.

This information processing system is a paid-for system. A service provider conducts billing for a user according to the user's virtual machine usage conditions. Fees may be determined according to the rank of a virtual machine's capacity. For example, the capacities of the virtual machines may be ranked according to the CPU capacity or the RAM memory size or the like allocated to the virtual machine. The fees to be generated when a virtual machine is used only during a certain time period in a particular rank are determined in advance for each rank. In the present example, it is assumed that invoicing for usage fees from the service provider to a user is conducted at the end of the month (the cutoff date being the last day of the month). However, other cycles may be used such as daily, weekly, or semi-annually.

Figure 3:
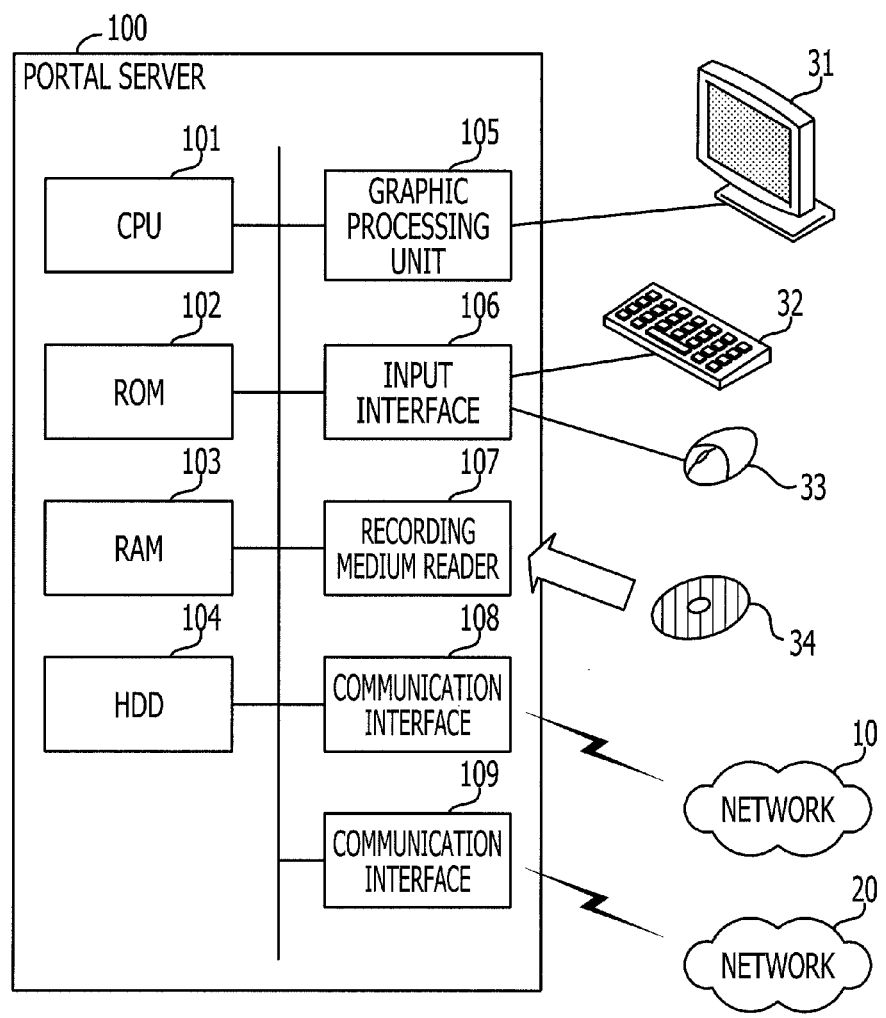
FIG. 3 illustrates an example of hardware of a server portal.

FIG. 3 illustrates an example of portal server hardware. The portal server 100 includes a CPU 101, a read-only memory (ROM) 102, a RAM 103, a hard disk drive (HDD) 104, a graphics processing unit 105, an input interface 106, a recording medium reader 107, and communication interfaces 108 and 109.

The CPU 101 runs OS programs and application programs and controls the entire portal server 100.

The ROM 102 stores certain programs such as a BIOS (basic input/output system) program that is run when the portal server 100 is activated. The ROM 102 may be, for example, a memory or a re-writable non-volatile memory.

The RAM 103 temporarily stores at least a portion of an OS program or an application program run by the CPU 101. The RAM 103 also temporarily stores at least a portion of data used in processing by the CPU 101.

The HDD 104 stores OS programs and application programs. The HDD 104 also stores data used in processing by the CPU 101. Another type of non-volatile storage device such as a Solid State Drive (SSD) may be used in place of (or in conjunction with) the HDD 104.

The graphics processing unit 105 is connected to a monitor 31. The graphics processing unit 105 displays images on the screen of the monitor 31 according to commands from the CPU 101.

The input interface 106 is connected to an input device such as a keyboard 32 and/or a mouse 33. The input interface 106 outputs input signals sent from the input device to the CPU 101.

The recording medium reader 107 is a reading device that reads data stored in a recording medium 34. The recording medium 34 stores, for example, programs that are run by the portal server 100. The portal server 100 may, for example, perform the below-mentioned management functions by running management programs stored on the recording medium 34. Specifically, management programs may be stored and distributed on the recording medium 34, which may be read by a computer.

For example, a magnetic recording device, an optical disk, a magneto-optic recording medium, or a semiconductor memory may be used as the recording medium 34. The magnetic recording device may be an HDD, a floppy disk, or a magnetic tape and the like. The optical disk may be a compact disc (CD), a recordable/rewritable CD (CD-R/RW), a digital versatile disc (DVD), or a DVD-R/RW/RAM. The magneto-optic recording medium may be a magneto-optical disk (MO). The semiconductor memory may be a flash memory device such as a universal serial bus (USB) memory device and the like.

The communication interfaces 108 and 109 are connected to the networks 10 and 20. The communication interface 108 is able to conduct data communication with the management server 200 and the execution servers 300, 300a, and 300b via the network 10. The communication interface 109 is able to conduct data communication with the clients 21, 22, and 23 via the network 20.

A management program may be stored in another server computer (not illustrated) connected to the network 10 and/or network 20. In this case, the portal server 100 is able to download and run a management program from the other server computer.

The clients 21, 22, and 23, the management server 200, and the execution servers 300, 300a, and 300b may be implemented by a hardware structure similar to that of the portal server 100.

Figure 4:
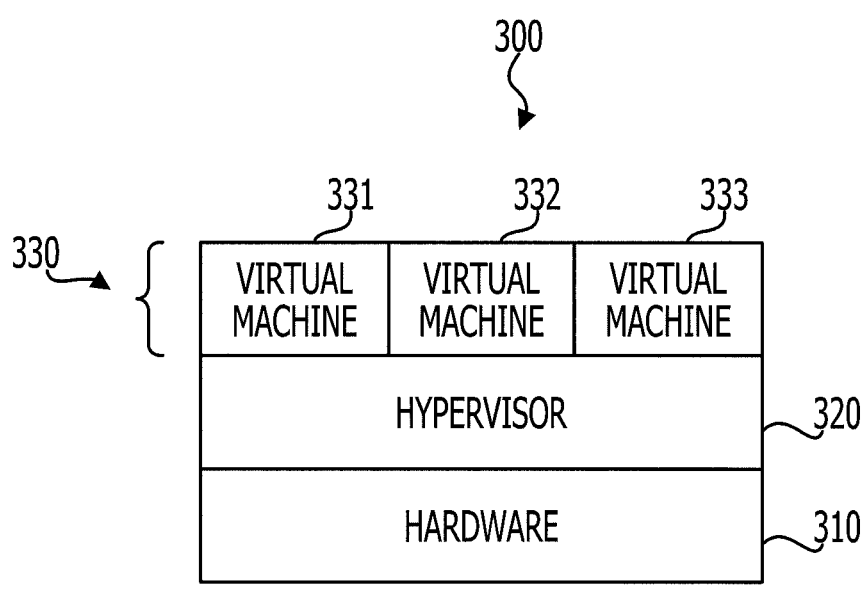
FIG. 4 is a block diagram of an example of a virtual machine layout.

FIG. 4 is a block diagram illustrating an example of a virtual machine layout. The execution server 300 includes a hardware layer 310, a hypervisor 320, and a virtual machine layer 330.

The hardware layer 310 is a layer belonging to the hardware resources included in the execution server 300. The hardware resources include, for example, a CPU, a RAM, an HDD, and a communication interface.

The hypervisor 320 implements the one or more virtual machines on the execution server 300. The hypervisor 320 activates and terminates each virtual machine and allocates hardware resources to each virtual machine according to instructions from the management server 200. The hypervisor 320 also arranges access to the virtual machine hardware resources so that each virtual machine may jointly use the resources in the hardware layer 310. The hypervisor 320 also monitors the usage conditions of the hardware resources allocated to each virtual machine.

The virtual machine layer 330 is a layer to which the virtual machines implemented on the execution server 300 by the hypervisor 320 belong. The virtual machine layer 330 includes multiple virtual machines 331, 332, and 333. The virtual machines 331, 332, and 333 each run their own independent OS. The OS to be run is specified by the hypervisor 320. The operating systems run by the virtual machines 331, 332, and 333 may be the same or different operating systems. A user operates a client to separately install application programs in the virtual machines 331, 332, and 333 to use the functions of those programs.

The execution servers 300a and 300b are implemented by structures similar to the structure of the execution server 300.

Figure 5:
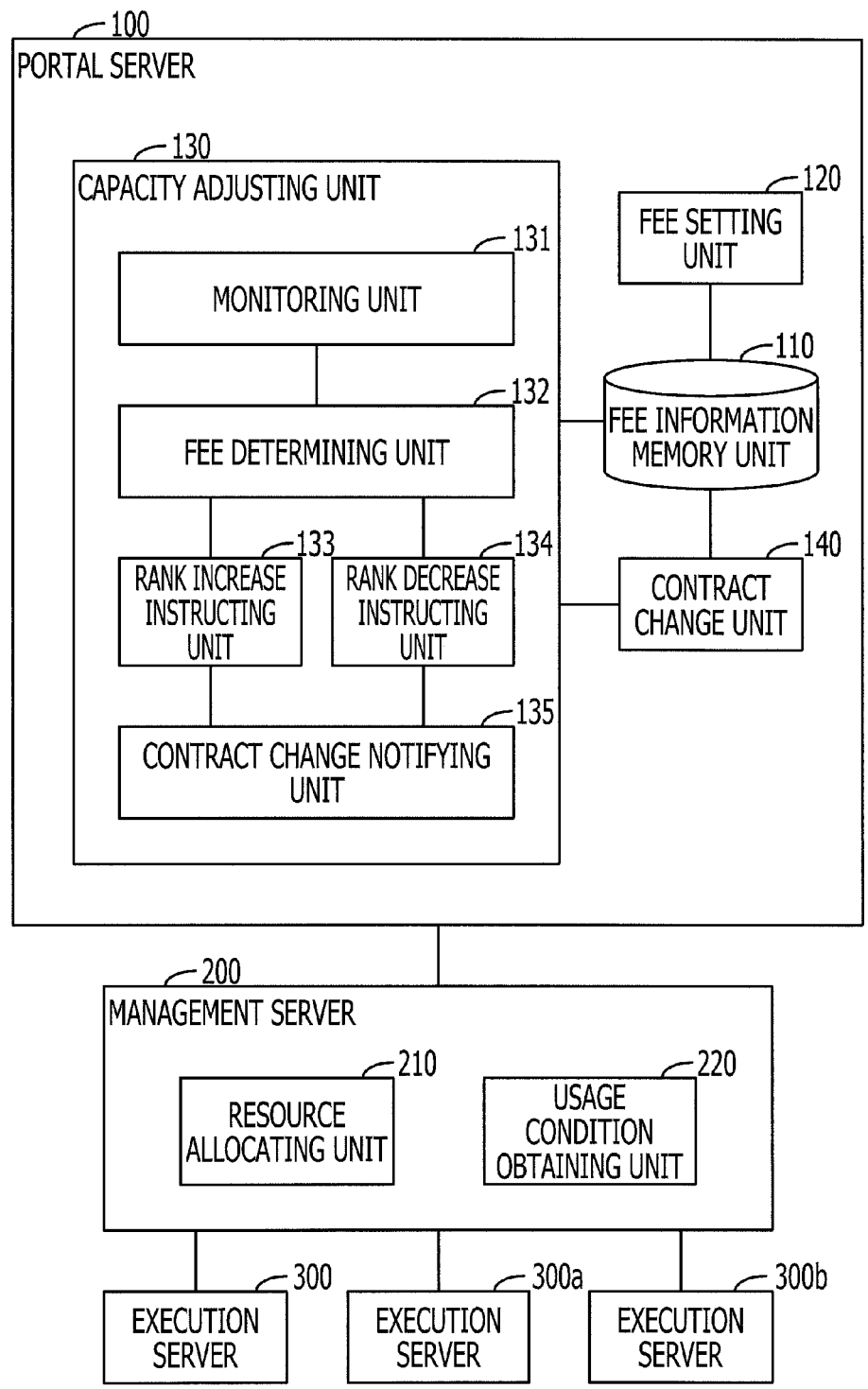
FIG. 5 is a block diagram illustrating functions of a portal server and a management server.

FIG. 5 is a block diagram illustrating functions of the portal server and the management server. The portal server 100 includes a fee information memory unit 110, a fee setting unit 120, a capacity adjusting unit 130, and a contract changing unit 140. Functions of these units are implemented on the portal server 100 according to a management program executed by the CPU 101. However, all or a portion of the functions of these units may be implemented with dedicated hardware.

The fee information memory unit 110 stores fee information used for billing the users. The fee information includes a fee reference table, a maximum allowable fee table, a fee summary table, and a resource management table. The fee reference table includes data that defines a billing method corresponding to a virtual machine capacity rank. The maximum allowable fee table includes data that defines an invoiceable upper limit (maximum fee) for each user. The fee summary table includes data that summarizes virtual machines allocated to users, the ranks of those virtual machines, and billing conditions up to the current time. The resource management table includes data that sets usage conditions of resources allocated to the virtual machines for each user.

The fee setting unit 120 receives the maximum allowable fee for each user from the clients 21, 22, and 23, and stores the maximum allowable fee in the fee information memory unit 110.

The capacity adjusting unit 130 adjusts the capacities of the virtual machines. The capacity adjusting unit 130 includes a monitoring unit 131, a fee determining unit 132, a rank increase instructing unit 133, a rank decrease instructing unit 134, and a contract change notifying unit 135.

The monitoring unit 131 periodically monitors usage condition of the resources allocated to the virtual machines on the execution servers 300, 300a, and 300b via the management server 200 to detect a lack of capacity in the virtual machines. Whether or not a virtual machine has a lack of capacity may be detected from a utilization rate of the resources allocated to each virtual machine. The utilization rate of a resource is one example of a load for a resource allocated to a virtual machine.

The fee determining unit 132 determines whether or not the rank of a virtual machine may be improved (that is, be increased in rank) when a lack of capacity in the virtual machine is detected by the monitoring unit 131. Specifically, the fee setting unit 120 updates fee summary data for each user based on the ranks of the virtual machines for each user and on utilization time periods during which the virtual machines are used for each rank. As a result, the fee determining unit 132 measures the utilization time periods of the virtual machines of each rank from after the previous fee settlement up to the present time. The fee determining unit 132 then refers to the fee information memory unit 110 to determine whether or not a usage fee anticipated after a rank increase exceeds the maximum allowable fee for that user.

If the maximum allowable fee is not exceeded, the fee determining unit 132 indicates a virtual machine that is to be increased in rank to the rank increase instructing unit 133. If the maximum allowable fee is exceeded, the fee determining unit 132 determines whether or not the capacity rank of another virtual machine may be reduced (that is, be decreased in rank). For example, the fee determining unit 132 estimates an actual allowance of resources from the current resource utilization rate and then determines whether that allowance is able to be satisfied with the capacity rank decreased by one rank. A rank decrease is determined to be allowable if the allowance is able to be satisfied or impossible if the allowance is not able to be satisfied. If the rank decrease is allowable, the fee determining unit 132 indicates the virtual machine that is to be decreased in rank to the rank decrease instructing unit 134. After the rank has been decreased, the fee determining unit 132 then determines once again whether or not an increase in the rank of the virtual machine with the lack of capacity is allowable.

Upon receiving the indication of a virtual machine that is to be increased in rank from the fee determining unit 132, the rank increase instructing unit 133 instructs the management server 200 to increase the amount of resources to the virtual machine that is to be increased in rank. The rank increase instructing unit 133 also notifies the contract change notifying unit 135 and the contract changing unit 140 about the rank increase.

Upon receiving indication of a virtual machine that is to be decreased in rank from the fee determining unit 132, the rank decrease instructing unit 134 instructs the management server 200 to decrease the amount of resources to the virtual machine that is to be decreased in rank. The rank decrease instructing unit 134 also indicates a contract change of the virtual machine that is to be decreased in rank to the contract changing unit 140. The rank decrease instructing unit 134 also outputs the details of the rank decrease to the contract change notifying unit 135.

The contract change notifying unit 135 reports the details of the rank increase or decrease to the user. For example, the contract change notifying unit 135 generates an email describing the details and sends the email to an email address of the user. The user thus learns about the rank increase or decrease by allowing the client 21, 22, or 23 to receive the email sent to the user so that the user may refer to the email.

The contract changing unit 140 refers to the fee information memory unit 110 to change the current rank of the virtual machine of the user due to an instruction from the rank increase instructing unit 133 or the rank decrease instructing unit 134.

The management server 200 has a resource allocating unit 210 and a usage condition obtaining unit 220. The functions of these units are implemented on the management server 200 by the execution of certain programs by a CPU in the management server 200. However, all or a portion of the functions of these units may be implemented with dedicated hardware.

The resource allocating unit 210 controls the amount of resources allocated for each virtual machine run in the execution servers 300, 300a, and 300b. The resource allocating unit 210 changes the amount of resources of each virtual machine in the execution servers 300, 300a, and 300b according to resource amount increase or decrease instructions from the rank increase instructing unit 133 and the rank decrease instructing unit 134.

The usage condition obtaining unit 220 sends inquiries to the hypervisors upon receiving a request from the monitoring unit 131 to obtain the usage conditions of the resources allocated to the virtual machines. The usage condition obtaining unit 220 sends the contents of the replies from the hypervisors to the monitoring unit 131.

FIG. 6 illustrates an example of a fee reference table data structure. A fee reference table 111 is stored in the fee information memory unit 110. The fee reference table 111 is an example of index information with values that change according to the amount of resources allocated. The association between the resource allocation amounts and fees is a positive correlation in which the fees increase as the resource allocation amounts increase.

Fields for capacity rank, CPU capacity value, memory size, monthly fee, and hourly fee are provided in the fee reference table 111. Information arranged in the horizontal direction across each field is associated with each other to indicate the contract contents relating to one contract rank.

Names of ranks for identifying each capacity rank are set in the capacity rank field. A CPU capacity value allocated as a resource is set in the CPU capacity value field. A RAM size allocated as a resource is set in the memory size field. A usage fee for one month of a certain rank is set in the monthly fee field. A usage fee for one hour of a certain rank is set in the hourly fee field.

For example, information including the capacity rank "mini," the CPU capacity value "1 GHz" (giga Hertz), the memory size "512 MB" (megabytes), the monthly fee "7200" (Yen), and the hourly fee "10" (Yen) is set in the fee reference table 111.

This information indicates that a CPU capacity equivalent to an operating frequency of 1 GHz and a memory size equivalent to 512 MB are allocated as resources to the virtual machines under the rank "mini." Additionally, the information indicates that the monthly usage fee is 7200 Yen, and the hourly usage fee is 10 Yen under the rank "mini."

Figure 7:
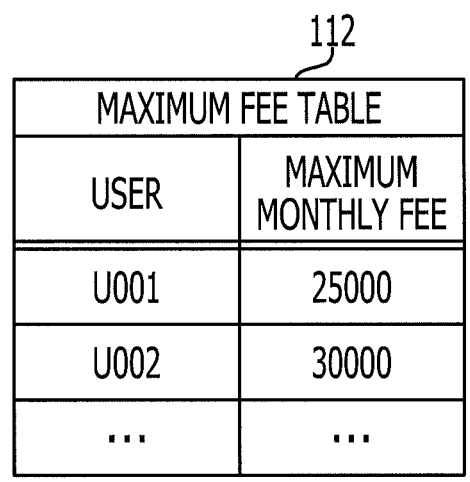
FIG. 7 illustrates an example of a data structure of a maximum fee table.

FIG. 7 illustrates an example of a data structure of a maximum fee table. A maximum fee table 112 is stored in the fee information memory unit 110. The maximum fee table 112 is a table that defines for each user an allowable upper limit of a fee.

User and maximum monthly fee fields are provided in the maximum fee table 112. Information arranged in the horizontal direction across each field is associated with each other to indicate the maximum monthly fee for one user.

User identification information is set in the user field. A maximum allowable monthly usage fee is set in the maximum monthly fee field. For example, information indicating that a maximum monthly fee of "25000" (Yen) is set for the user "U001" in the maximum fee table 112. This information indicates that the maximum allowable monthly usage fee of the user U001 is 25000 Yen.

FIG. 8 illustrates an example of a fee summary table data structure. A fee summary table 113 is stored in the fee information memory unit 110. User, virtual machine (VM) name, current rank, mini time, small time, medium time, large time, and total fee fields are provided in the fee summary table 113. Information arranged in the horizontal direction across each field is associated with each other to indicate the billing conditions for one user.

User identification information is set in the user field. The name of the virtual machine allocated to a certain user is set in the VM name field. The current rank of the virtual machine is set in the current rank field. A total of hours used since the previous fee settlement under the mini rank is set in the mini time field. A total of hours used since the previous fee settlement under the small rank is set in the small time field. A total of hours used since the previous fee settlement under the medium rank is set in the medium time field. A total of hours used since the previous fee settlement under the large rank is set in the large time field. A billing amount at the current time related to the applicable virtual machine is set in the total fee field.

For example, information that indicates the user as "U001," the VM name as "VM1," the current rank as "mini," the mini time as "10" (hours), the small time as "20" (hours), the medium time as "120" (hours), the large time as "18" (hours), and the total fee as "6740" (Yen) is set in the fee summary table 113.

This information indicates that the virtual machine with the VM name "VM1" is allocated to the user "U001," and that the current rank of that virtual machine is "mini." Additionally, the time spent from the previous usage fee settlement up to the current time in the "mini" rank is indicated as 10 hours, 20 hours in the "small" rank, 120 hours in the "medium" rank, and 18 hours in the "large" rank. The fee total to be billed for the applicable virtual machine up to the current time is indicated as 6740 Yen.

Moreover, information indicating, for example, the user as "U001," the VM name as "all VMs," the current rank as "-" (hyphen), the mini time as "160" hours, the small time as "130" hours, the medium time as "300" hours, the large time as "82" hours, and the total fee as "22760" Yen is set in the fee summary table 113.

This information indicates a total value of all the VMs from virtual machines VM1 to VM4, which are allocated to the user "U001." As a result, the current rank indicates no setting (hyphen). Specifically, the time that the virtual machines VM1 to VM4 are being used from the previous usage fee settlement up to the current time is 160 hours under the "mini" time, 130 hours under the "small" time, 300 hours under the "medium" time, and 82 hours under the "large" time. Additionally, a total fee to be billed for all the virtual machines up to the current time is 22760 Yen.

FIG. 9 illustrates an example of a resource management table data structure. A resource management table 114 is stored in the fee information memory unit 110. Fields for a user, a VM name, a CPU allotment, a CPU utilization rate, a memory allotment, and a memory utilization rate are provided in the resource management table 114. Information arranged in the horizontal direction across each field is associated with each other to indicate resource usage conditions of one user.

User identification information is set in the user field. The name of a virtual machine allocated to a certain user is set in the VM name field. The capacity of a CPU allocated to the virtual machine is set in the CPU allotment field. A CPU utilization rate for the particular CPU capacity is set in the CPU utilization rate field. The size of a memory allocated to the virtual machine is set in the memory allotment field. The utilization rate of the memory relating to the particular memory size is set in the memory utilization rate field.

For example, information indicating a user as "U001," a VM name as "VM1", a CPU allotment as "1 GHz," a CPU utilization rate as "50%," a memory allotment as "512 MB," and a memory utilization rate as "60%" is set in the resource management table 114.

This information indicates that the current performance of the virtual machine "VM1" allocated to the user "U001" corresponds to a CPU capacity of 1 GHz and to a memory size of 512 MB. Moreover, the information indicates that the CPU utilization rate is 50% and the memory utilization rate is 60% for the current performance.

The following is a description of processing steps of an information processing system with the above configuration. First, steps for the portal server 100 rank changing processing will be described. Rank change processing is started by the capacity adjusting unit 130 at the beginning of a certain cycle.

Figure 10:
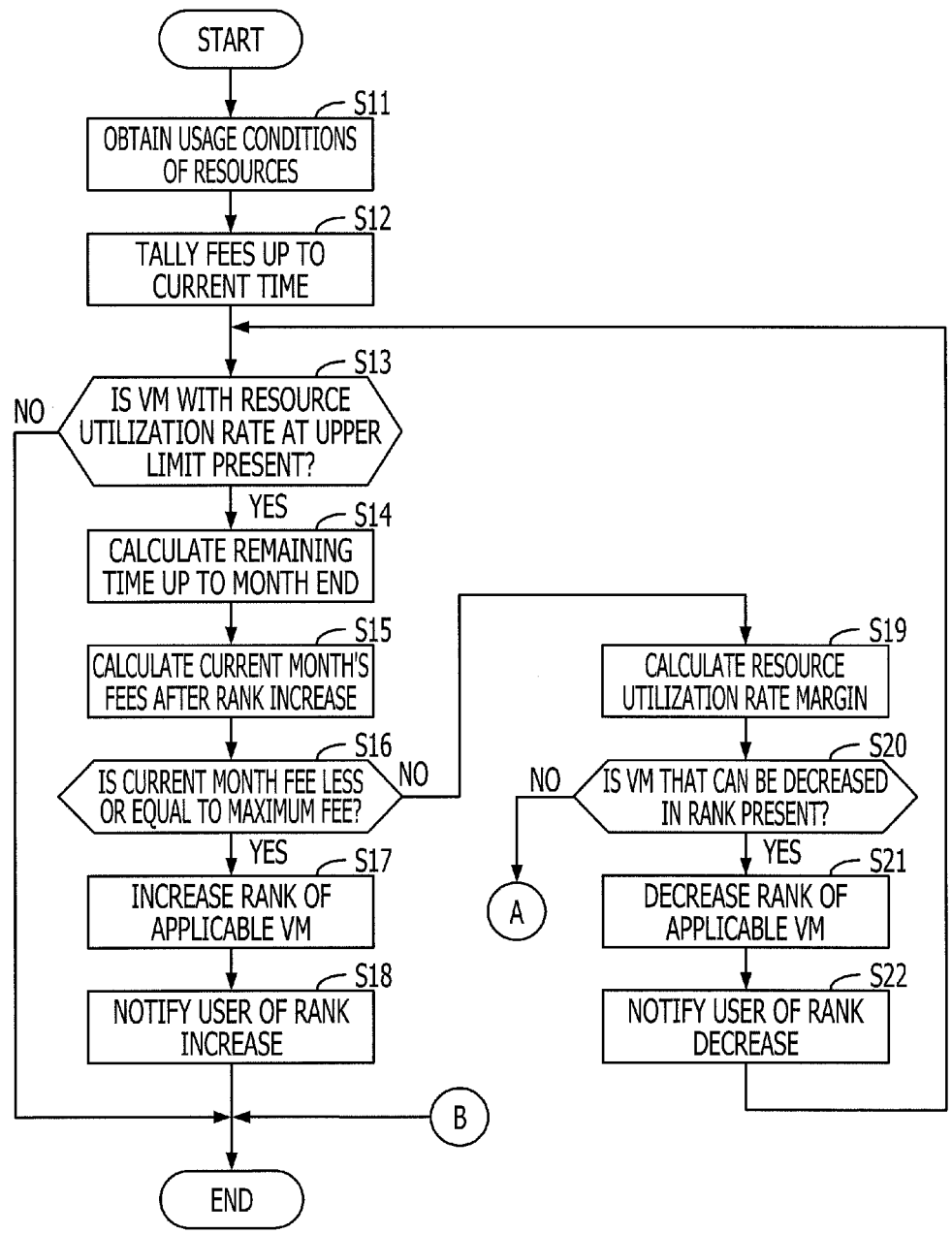
FIG. 10 is a flow chart illustrating processing for changing ranks.

FIG. 10 is a flow chart illustrating rank change processing. The processing illustrated in FIG. 10 will be explained using step numbers.

(Step S11) the monitoring unit 131 sends a request to the management server 200 to obtain the usage conditions of resources allocated to each virtual machine. The monitoring unit 131 obtains from the management server 200 the usage conditions of the resources corresponding to the request. The monitoring unit 131 refers to the fee information memory unit 110 and updates the resource management table 114 according to the obtained information.

(Step S12) The fee determining unit 132 refers to the fee summary table 113 stored in the fee information memory unit 110 to tally the usage fee of the current month according to the rank of each virtual machine and the utilization time periods from the previous usage fee settlement up to the current time. The fee determining unit 132 updates the fee summary table 113 using the tallied result.

(Step S13) The monitoring unit 131 refers to the resource management table 114 and determines whether or not there is a virtual machine with a resource utilization rate at the upper limit. If such a virtual machine is present, the processing advances to step S14. If no such virtual machine is present, the processing is terminated. Whether or not the resource utilization rate has reached the upper limit may be determined, for example, by whether or not the CPU utilization rate related to the CPU capacity allocated to the virtual machine is 100%. In the example with the resource management table 114, the CPU utilization rate is 100% in the virtual machine VM2. In this case, the monitoring unit 131 determines that there is a virtual machine whose resource utilization rate has reached the upper limit. The upper limit may be defined as appropriate. For example, a utilization rate of 90% or 80% may be used.

(Step S14) The fee determining unit 132 calculates a remaining time T up to the end of the month.

(Step S15) The fee determining unit 132 calculates the current month's fee if the rank of a virtual machine determined as having a lack of capacity by the monitoring unit 131 is increased. For example, it is assumed that an attempt is made to increase the rank of the virtual machine VM2. In this case, since the current rank of the virtual machine VM2 according to the fee summary table 113 is "small", the fee determining unit 132 calculates the current month's fee as if the rank was "medium". Specifically, a value MA1 is derived by multiplying T by the hourly fee with the virtual machine VM2 rank as "medium." Further, a value M2 is derived by multiplying T by the hourly fees corresponding to the current ranks of the other virtual machines VM1, VM3, and VM4 allocated to the user "U001." The current month's fee MA after the rank increase may be derived by tallying MA1, M2, and the current total fee.

(Step S16) The fee determining unit 132 refers to the maximum fee table 112 stored in the fee information memory unit 110 to determine whether or not the current month's fee MA after the rank increase is less than or equal to the maximum fee (the maximum monthly fee in this embodiment) for the particular user. If the current month's fee MA is less than or equal to the maximum fee, the fee determining unit 132 indicates the virtual machine to be increased in rank to the rank increase instructing unit 133, and the processing advances to step S17. If the current month's fee MA is more than the maximum fee, the processing advances to step S19.

(Step S17) The rank increase instructing unit 133 refers to the fee reference table 111 stored in the fee information memory unit 110 to determine the resource amount corresponding to the rank for the virtual machine after the rank increase. The rank increase instructing unit 133 indicates the specified virtual machine rank increase (including specifying the resource amounts after the rank increase) to the management server 200. The rank increase instructing unit 133 also notifies the contract changing unit 140 about the rank increase. The contract changing unit 140 adjusts the fee summary table 113 to update the current rank of the virtual machine whose rank was increased. For example, if the virtual machine VM2 is increased in from "small" to "medium", the increase is reflected in the fee summary table 113.

(Step S18) The rank increase instructing unit 133 notifies the contract change notifying unit 135 about the rank increase. The contract change notifying unit 135 generates an email with a message indicating details of the rank increase and sends the email to the email address of the user.

(Step S19) The fee determining unit 132 refers to usage conditions of virtual machines that have not been detected as having a lack of capacity among the virtual machines allocated to the particular user to calculate whether there is a resource utilization rate margin. The resource utilization rate margin may be derived, for example, by comparing the usage conditions in the current ranks of the virtual machines with the capacity of the virtual machines at one rank lower. For example, if a value derived by multiplying the CPU utilization rate by the CPU capacity at the current rank is less than the CPU capacity at one rank below, and if a value derived by multiplying the memory utilization rate by the memory size at the current rank is smaller than the memory size at one rank below, the fee determining unit 132 determines that there is a margin. For example, according to the resource management table 114, since the CPU capacity of the virtual machine VM3 is 4 GHz, and the CPU utilization rate of the same is 60%, the CPU capacity being substantially used is 2.4 GHz. Similarly, since the memory size is 2 GB and the memory utilization rate is 40%, the memory size being substantially used by the virtual machine VM3 is 0.8 GB. As a result, the virtual machine VM3 may be determined as having a margin since the virtual machine VM3 may operate at the lower rank of "small." Correspondingly, the virtual machine VM3 is determined as not having a margin if any of the above is larger than the capacity value at one rank below.

(step S20) The fee determining unit 132 determines whether or not there is a virtual machine that may be moved to a lower rank. If there is a virtual machine that may be moved to a lower rank, the fee determining unit 132 indicates the applicable virtual machine to the rank decrease instructing unit 134 and the processing advances to step S21. If not, the processing advances to step S23 (see FIG. 11). The presence of a virtual machine that may be moved to a lower rank may be determined according to the presence of the margin calculated in step S19. That is, if there is a virtual machine that has a margin, it is determined that there is a virtual machine that may be moved to a lower rank. If there is no virtual machine that has a margin, it is determined that there is no virtual machine that may be moved to a lower rank.

(Step S21) The rank decrease instructing unit 134 refers to the fee reference table 111 to determine the resource amount corresponding to the new rank after the rank has been decreased. The rank decrease instructing unit 134 indicates the specified virtual machine rank decrease (including specifying the amount of resources after the rank decrease) to the management server 200. The rank decrease instructing unit 134 also notifies the contract changing unit 140 of the rank decrease. The contract changing unit 140 adjusts the fee summary table 113 to update the current rank of the virtual machine whose rank was decreased. For example, if the virtual machine VM3 is decreased in rank from "medium" to "small", the decrease is reflected in the fee summary table 113.

(Step S22) The rank decrease instructing unit 134 notifies the contract change notifying unit 135 of the rank decrease. The contract change notifying unit 135 generates an email with a message indicating the rank decrease and sends the email to the email address of the user.

Figure 11:
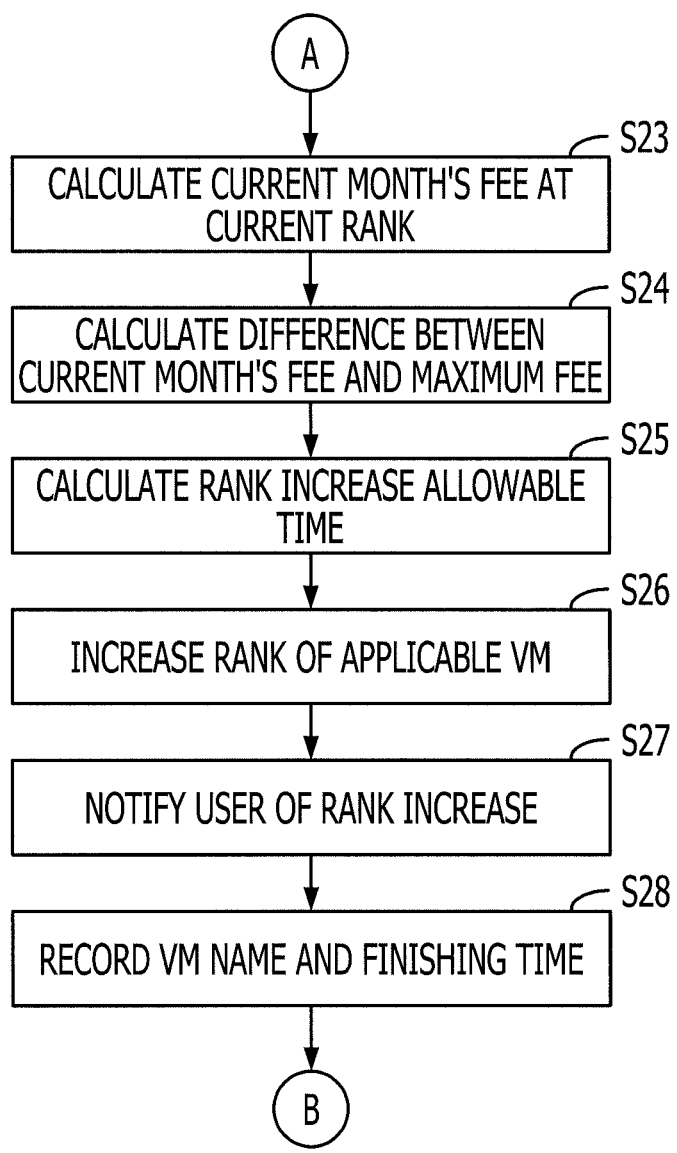
FIG. 11 is a continuation of the flow chart illustrating the process for changing ranks.

FIG. 11 is a continuation of the flow chart illustrating processing for changing ranks. The processing illustrated in FIG. 11 will be explained below using step numbers.

(Step S23) The fee determining unit 132 calculates the current month's fee MB at the current rank. The method for deriving the current month's fee MB is similar to the method described in step S15 in FIG. 10. However, instead of assuming that a rank increase occurs when a virtual machine with a lack of capacity is detected, a value MB 1 is derived by multiplying the remaining time T until the end of the month by the hourly fee at the current rank of the applicable virtual machine. The current month's fee MB under the current rank may be derived by tallying MB1, M2, and the current total fee.

(Step S24) The fee determining unit 132 refers to the maximum fee table 112 to calculate a difference S between the current month's fee MB under the current rank and the maximum fee for the particular user.

(Step S25) The fee determining unit 132 calculates a rank increase allowable time for the virtual machine with the lack of capacity. Specifically, the fee determining unit 132 derives a value by dividing the difference S derived in step S24 by the hourly fee after the rank increase. For example, it is assumed that the difference S corresponding to the virtual machine VM2 with the lack of capacity is 3000 Yen. In that case, the rank increase allowable time of the virtual machine VM2 may be calculated as 3000/40=75 hours if the rank after the rank increase is "medium."

(Step S26) The fee determining unit 132 notifies the rank increase instructing unit 133 of the virtual machine that is to be increased in rank and the rank increase allowable time. The rank increase instructing unit 133 refers to the fee reference table 111 to learn the resource amount corresponding to the rank after the rank has been increased. The rank increase instructing unit 133 indicates the rank increase of the specified virtual machine to the management server 200. The rank increase instructing unit 133 also notifies the contract changing unit 140 of the rank increase. The contract changing unit 140 adjusts the fee summary table 113 to update the current rank of the virtual machine whose rank was increased.

(Step S27) The rank increase instructing unit 133 notifies the contract change notifying unit 135 about the rank increase. The contract change notifying unit 135 generates an email with a message indicating details of the rank increase and sends the email to the email address of the user.

(Step S28) The rank increase instructing unit 133 records the VM name of the virtual machine that is increased in rank as specified in step S26, and the rank increase finishing time in the fee information memory unit 110. The rank increase instructing unit 133 may calculate the rank increase finishing time by adding the rank increase allowable time to the current time. The original rank of the applicable virtual machine before the rank increase may also be recorded. The processing is then completed.

In this way, the portal server 100 manages rank increases and rank decreases of the virtual machines.

The performance of the virtual machine may also be controlled in step S20 of FIG. 10 such that the rank does not fall below a previously set lower limit. For example, a decrease in the rank of an applicable virtual machine may not be allowed if, during a rank decrease, the rank falls below a lower performance level indicated by the user. As a result, the minimum performance of the virtual machine may be maintained.

The following describes processing to restore a rank when the rank increase finishing time is reached for a virtual machine whose rank was increased in step S26.

Figure 12:
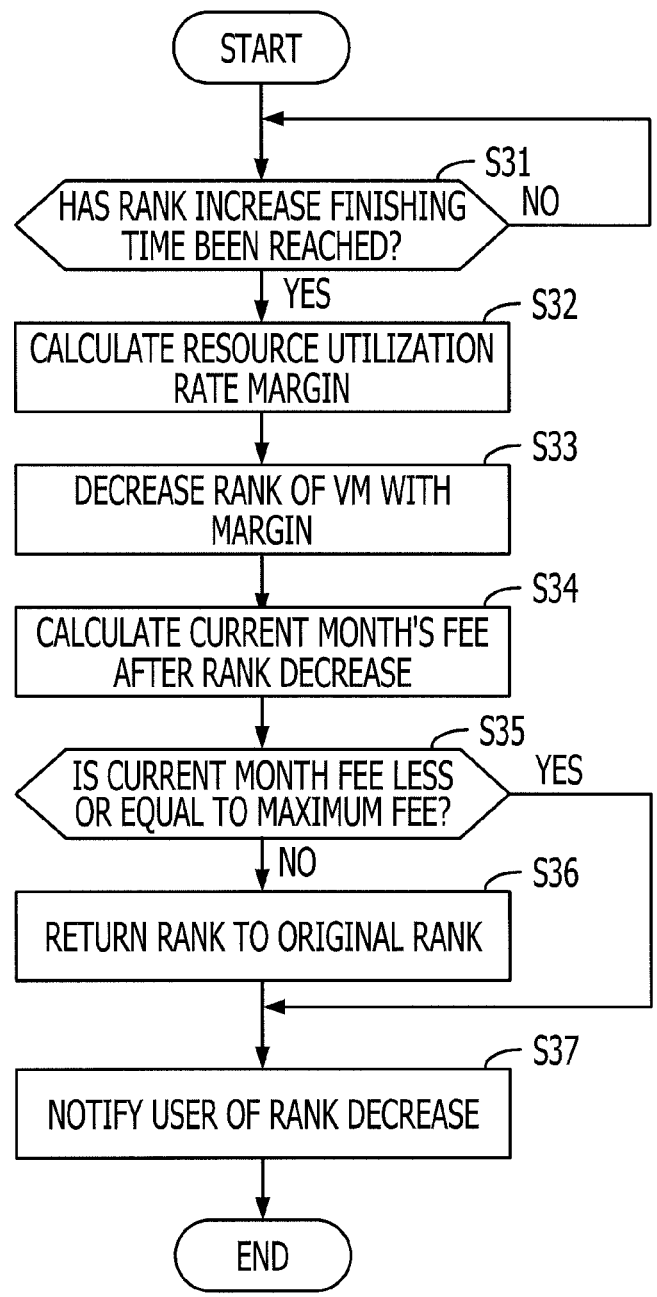
FIG. 12 is a flow chart illustrating processing for restoring ranks.

FIG. 12 is a flow chart illustrating processing for restoring ranks. The processing illustrated in FIG. 12 will be explained using step numbers.

(Step S31) The monitoring unit 131 refers to the fee information memory unit 110 to determine whether or not the rank increase finishing time has been reached. If the rank increase finishing time has been reached, the processing advances to step S32. If the rank increase finishing time has not been reached, the processing advances to step S31.

(Step S32) The fee determining unit 132 refers to usage conditions of virtual machines that have not received a rank increase in step S26 among the virtual machines allocated to the particular user to calculate whether there is a resource utilization rate margin. The method to calculate the resource utilization rate margin is described in step S19 of FIG. 10.

(Step S33) The fee determining unit 132 indicates a virtual machine with a margin to the rank decrease instructing unit 134 as a virtual machine that is to be decreased in rank. The rank decrease instructing unit 134 refers to the fee reference table 111 stored in the fee information memory unit 110 to determine the amount of resources corresponding to the rank after the rank decrease for the virtual machine indicated by the fee determining unit 132. The rank decrease instructing unit 134 indicates the rank decrease of the specified virtual machine to the management server 200. The rank decrease instructing unit 134 also notifies the contract changing unit 140 of the rank decrease. The contract changing unit 140 adjusts the fee summary table 113 to update the current rank of the virtual machine whose rank was decreased.

(Step S34) The fee determining unit 132 calculates the current month's fee MC after the rank decrease in step S33. The method for deriving the current month's fee MC is similar to the method described in step S15 in FIG. 10. Specifically, the fee determining unit 132 first refers to the fee summary table 113 stored in the fee information memory unit 110 to calculate the current total fee. The fee determining unit 132 then calculates the remaining time T until the end of the month. The fee determining unit 132 then calculates a value MC1 by multiplying the remaining time T by the hourly fees at the current ranks for all the virtual machines allocated to the particular user, and then tallying the results. Furthermore, the fee determining unit 132 calculates the current month's fee MC after the rank decrease by adding MC1 to the current total fee.

(Step S35) The fee determining unit 132 refers to the maximum fee table 112 stored in the fee information memory unit 110 to determine whether or not the current month's fee MC after the rank decrease is less than or equal to the maximum fee for the particular user. If the current month's fee MC after the rank decrease is less than or equal to the maximum fee, the processing advances to step S37. If the current month's fee MC after the rank decrease is greater than the maximum fee, the fee determining unit 132 indicates the virtual machine that has reached the rank increase finishing time to the rank decrease instructing unit 134, and the processing advances to step S36.

(Step S36) The rank decrease instructing unit 134 refers to the maximum fee table 112 to determine the amount of resources corresponding to the rank after the rank decrease (original rank) of the virtual machine that has reached the rank increase finishing time. The rank decrease instructing unit 134 indicates the specified virtual machine to be decreased in rank to the management server 200. The rank decrease instructing unit 134 also notifies the contract changing unit 140 of the rank decrease. The contract changing unit 140 adjusts the fee summary table 113 to update the current rank of the virtual machine whose rank was decreased.

(Step S37) The rank decrease instructing unit 134 notifies the contract change notifying unit 135 of the rank decrease. The contract change notifying unit 135 generates an email with a message indicating the rank decrease and sends the email to the email address of the user. No virtual machine rank decrease occurs if there is no virtual machine decreased in rank in step S33 and the current month's fee MC is determined to be not more than the maximum fee in step S35. In this case, notification of a rank decrease to the user is not conducted.

In this way, the portal server 100 restores the rank of the virtual machine that has reached the rank increase finishing time to the original rank. As a result, the virtual machine ranks may be appropriately controlled so that the usage fee does not exceed a user's maximum fee.

The performance of the virtual machine may also be controlled in step S33 such that the rank does not fall below a previously set lower limit. For example, notification of a decrease in the rank of an applicable virtual machine may not be made if, due to a rank decrease, the rank falls below a lower performance level set by the user. As a result, the minimum performance of the virtual machine may be maintained.

The management server 200 changes the virtual machine resource amount according to an instruction from the portal server 100. The following describes processing to change resource allocations by the management server 200.

Figure 13:
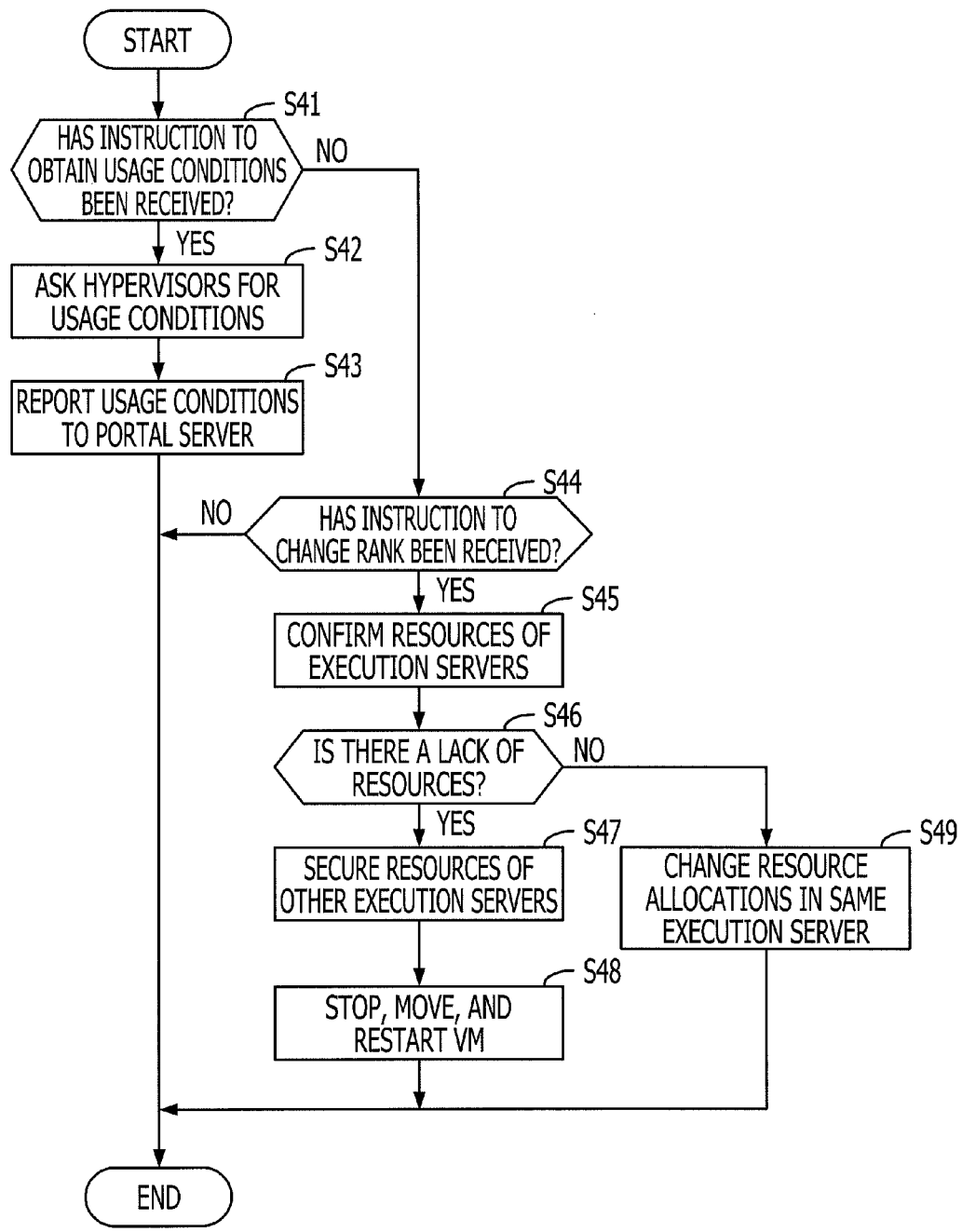
FIG. 13 is a flow chart illustrating processing for managing resources.

FIG. 13 is a flow chart illustrating processing for managing resources. The processing illustrated in FIG. 13 will be explained using step numbers.

(Step S41) The usage condition obtaining unit 220 determines whether or not a request from the portal server 100 to obtain usage conditions has been received. If a request has been received, the processing advances to step S42. If a request has not been received, the processing advances to step S44.

(Step S42) The usage condition obtaining unit 220 asks the hypervisors of the execution servers 300, 300a, and 300b to provide the usage conditions of the resources allocated to each virtual machine.

(Step S43) The usage condition obtaining unit 220 informs the portal server 100 of the usage conditions received as a result of the asking. The processing is then completed.

(Step S44) The resource allocating unit 210 determines whether or not a rank change instruction has been received. If a rank change instruction has been received, the processing advances to step S45. The processing is completed if no rank change instruction has been received.

(Step S45) The usage condition obtaining unit 220 confirms the usage conditions of the resources of the execution servers 300, 300a, and 300b.

(Step S46) The resource allocating unit 210 determines whether or not there is a lack of resources in an execution server running a virtual machine to be increased in rank. If there is a lack of resources, the processing advances to step S47. If there is no lack of resources, the processing advances to step S49. If the rank change instruction is a rank decrease instruction, the processing advances to step S49. This is because new resources do not need to be confirmed for a rank decrease.

(Step S47) The resource allocating unit 210 secures the resources for moving the virtual machine to the hypervisors of another execution server. For example, the resource allocating unit 210 secures the resources from the execution server with the lowest resource utilization rate among the other execution servers. The secured resource amount is an amount corresponding to the virtual machine performance after the rank increase.

(Step S48) The resource allocating unit 210 instructs the hypervisor to move the virtual machine. The hypervisor moves the virtual machine from the source execution server to the destination execution server as described below. (1) Data in a memory region allocated to the virtual machine at the source server is copied to a memory region allocated to the virtual machine in the destination server. (2) The virtual machine in the source server is stopped and the CPU state of the applicable virtual machine is copied from the source server to the destination server. (3) The virtual machine is restarted in the destination server and the resources in the source server are released. (4) Network settings (addresses and the like) for the virtual machine in the destination server are updated. The processing is then completed.

(Step S49) The resource allocating unit 210 changes the resource allocations in the same execution server.

In this way, if the processing capacity of the execution server that is to run a virtual machine is exceeded when the management server 200 conducts a rank increase, the virtual machine is moved to another execution server having a processing capacity margin. The destination execution server runs the applicable virtual machine at the performance level of after the rank increase.

There is a possibility that, when the processing capacity of an execution server is exceeded and the rank of a virtual machine is increased, a lack of resources in the execution server may not only affect the applicable virtual machine but also the operations of other virtual machines. In this case, a virtual machine may be moved to a virtual server, such as by the management server 200, according to loads on the execution servers when a rank increase occurs. As a result, the effect on other virtual machines may be reduced. Moreover, the rank of a virtual machine may be appropriately increased by securing resources in other execution servers even when there is a lack of resources in the current execution server for the virtual machine and the desired performance for a rank increase is not secured.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing apparatus that controls a resource allocation amount a plurality of virtual machines run by a computer, the information processing apparatus comprising:

a memory that stores an allowable index upper limit that is applicable to all of the virtual machines combined and stores, for each of the plurality of virtual machines individually, index information indicating an association between the resource allocation amount and an index for the respective virtual machine; and a processor that, when a virtual machine lacking resources is detected from among the plurality of virtual machines based on a resource usage status, calculates an index value for all of the virtual machines combined when an amount of resources allocated to the detected virtual machine is increased and compares the calculated index value with the allowable index upper limit, and when the calculated index value is less than or equal to the allowable index upper limit, increases the resource allocation amount allocated to the detected virtual machine such that the index value for all of the virtual machines combined does not exceed the allowable index upper limit, and when the calculated index value is greater than the allowable index upper limit for the detected virtual machine, determines whether the index value for all of the virtual machines combined is to be less than or equal to the allowable index upper limit when an amount of resources allocated to another one of the plurality of virtual machines having different index information than the detected virtual machine is reduced and an amount of resources allocated to the detected virtual machine is increased, and when it is determined that the index value for all of the virtual machines combined is to be less than or equal to the allowable index upper limit when an amount of resources allocated to the another one of the plurality of virtual machines is reduced and an amount of resources allocated to the detected virtual machine is increased, increases the resource allocation amount allocated to the detected virtual machine and reduces the resource allocation amount allocated to the another virtual machine such that the index value for all of the virtual machines combined does not exceed the allowable index upper limit.

2. The information processing apparatus according to claim 1, wherein
the processor calculates an allowable increase time period from a difference between the index for the detected virtual machine before the resource allocation amount for the detected virtual machine is increased and the allowable index upper limit, and maintains the increased resource allocation amount for the detected virtual machine until the calculated time period has elapsed.

3. The information processing apparatus according to claim 2, wherein
after the calculation time period has elapsed, the processor decreases the resource allocation amount of the detected virtual machine and increases the resource allocation amount of the another virtual machine.

4. The information processing apparatus according to claim 1, wherein the index value is a sum of fees generated by using the one or the plurality of virtual machines.

5. The information processing apparatus according to claim 1, wherein
the memory stores the index information for each user, and
the processor changes the resource allocation amount for each user based on the index value in a certain time period calculated for each user.

6. A virtual machine management method for an apparatus that controls a resource allocation amount for one or a plurality of virtual machines run by a computer, the virtual machine management method comprising:
storing, in a memory, an allowable index upper limit that is applicable to all of the virtual machines combined and storing, for each of the plurality of virtual machines individually, index information indicating an association between the resource allocation amount and an index for the respective virtual machine;
detecting a virtual machine, from among the plurality of virtual machines, lacking resources based on a resource usage status of the computer;
calculating an index value for all of the virtual machines combined when an amount of resources allocated to the detected virtual machine is increased and comparing the calculated index value with the allowable index upper limit for the detected virtual machine;
when the calculated index value is less than or equal to the allowable index upper limit, increasing the resource allocation amount for the detected virtual machine such that the index value for all of the virtual machines combined does not exceed the allowable index upper limit stored in the memory; and
when the calculated index value is greater than the allowable index upper limit for the detected virtual machine, determining whether the index value for all of the virtual machines combined is to be less than or equal to the allowable index upper limit when an amount of resources allocated to another one of the plurality of virtual machines having different index information than the detected virtual machine is reduced and an amount of resources allocated to the detected virtual machine is increased, and when it is determined that the index value for all of the virtual machines combined is to be less than or equal to the allowable index upper limit when an amount of resources allocated to the another one of the plurality of virtual machines is reduced and an amount of resources allocated to the detected virtual machine is increased, increasing the resource allocation amount allocated to the detected virtual machine and reduces the resource allocation amount allocated to the another virtual machine such that the index value for all of the virtual machines combined does not exceed the allowable index upper limit.

7. A non-transitory computer-readable medium storing a virtual machine management program that controls a resource allocation amount for one or a plurality of virtual machines run by an information processing apparatus, the program causing a computer to:
store, in a memory, an allowable index upper limit that is applicable to all of the virtual machines combined and store, for each of the plurality of virtual machines individually, index information indicating an association between the resource allocation amount and an index for the respective virtual machine;
detect a virtual machine, from among the plurality of virtual machines, lacking resources based on a resource usage status of the information processor apparatus;
calculate an index value for all of the virtual machines combined when an amount of resources allocated to the detected virtual machine is increased and compare the calculated index value with the allowable index upper limit for the detected virtual machine;
when the calculated index value is less than or equal to the allowable index upper limit, increase the resource allocation amount for the detected virtual machine such that the index value for all of the virtual machines combined does not exceed the allowable index upper limit stored in the memory; and
when the calculated index value is greater than the allowable index upper limit for the detected virtual machine, determine whether the index value for all of the virtual machines combined is to be less than or equal to the allowable index upper limit when an amount of resources allocated to another one of the plurality of virtual machines having different index information than the detected virtual machine is reduced and an amount of resources allocated to the detected virtual machine is increased, and when it is determined that the index value for all of the virtual machines combined is to be less than or equal to the allowable index upper limit when an amount of resources allocated to the another one of the plurality of virtual machines is reduced and an amount of resources allocated to the detected virtual machine is increased, increase the resource allocation amount allocated to the detected virtual machine and reduces the resource allocation amount allocated to the another virtual machine such that the index value for all of the virtual machines combined does not exceed the allowable index upper limit.

\* \* \* \* \*